United States Patent [19]

Kurtzberg et al.

[11] Patent Number: 5,155,677
[45] Date of Patent: Oct. 13, 1992

[54] MANUFACTURING PROCESS OPTIMIZATIONS

[75] Inventors: Jerome M. Kurtzberg; Menachem Levanoni, both of Yorktown Heights, N.Y.

[73] Assignee: International Business Machines Corporation, Armonk, N.Y.

[21] Appl. No.: 860,110

[22] Filed: Mar. 30, 1992

Related U.S. Application Data

[63] Continuation-in-part of Ser. No. 440,057, Nov. 21, 1989, abandoned.

[51] Int. Cl.$^5$ .................. G05B 13/07; G06F 15/46
[52] U.S. Cl. ...................................... 364/156; 364/468
[58] Field of Search ............ 364/148, 152, 156, 468

[56] References Cited

U.S. PATENT DOCUMENTS

| | | | |
|---|---|---|---|
| 3,079,079 | 2/1963 | Phister, Jr. et al. | 235/151 |
| 3,534,400 | 10/1970 | Dahlin | 235/151.1 |
| 3,778,603 | 12/1973 | Sweeney, Jr. | 235/151.12 |
| 3,814,916 | 6/1974 | Sweeney, Jr. | 235/151.12 |
| 3,826,905 | 7/1974 | Valkama et al. | 235/151.12 |
| 3,862,403 | 1/1975 | Kurihara | 235/150.1 |
| 3,891,836 | 6/1975 | Lee | 235/151.12 |
| 4,349,869 | 9/1982 | Prett et al. | 364/159 |
| 4,406,399 | 9/1983 | Furuta et al. | 236/15 BC |
| 4,451,878 | 5/1984 | Shigemasa | 364/151 |
| 4,585,603 | 4/1986 | Furuta et al. | 264/40.6 |
| 4,616,308 | 10/1986 | Morshedi et al. | 364/159 |
| 4,736,316 | 4/1988 | Wallman | 364/149 |
| 4,807,108 | 2/1989 | Ben-Arieh et al. | 364/148 |

OTHER PUBLICATIONS

E. H. Bristol, "The Design of Industrially Useful Adaptive Controllers", ISA Transactions, vol. 22, No. 3, 1983, pp. 17–25.

G. E. P. Box, "The Exploration and Exploitation of Response Surfaces", Biometrics, Mar. 1954, pp. 16–60.

Primary Examiner—Jerry Smith
Assistant Examiner—Patrick D. Muir
Attorney, Agent, or Firm—Philip J. Feig

[57] ABSTRACT

A non-iterative method for selecting manufacturing process parameters set point values which result in a specified process response and which values are close to design parameter values is based on a second order response surface mapping representation of the manufacturing process. The best set point values are determined in a single computation.

8 Claims, 1 Drawing Sheet

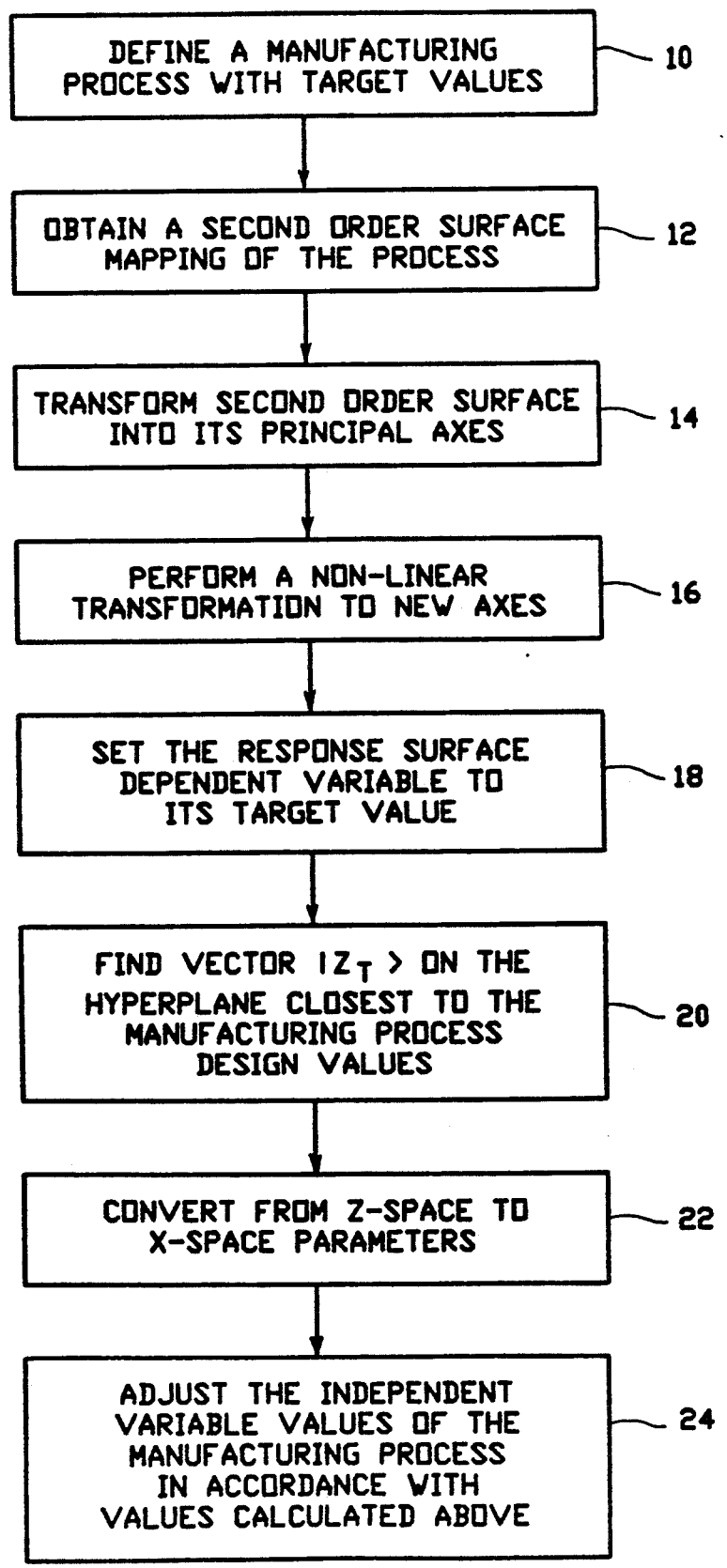

MANUFACTURING PROCESS OPTIMIZATIONS

This application is a continuation-in-part of application Ser. No. 07/440,057 filed Nov. 21, 1989 now abandoned.

BACKGROUND OF THE INVENTION

The present invention concerns a method for selecting manufacturing process variable values for manufacturing process optimization. Specifically, a non-iterative method for selecting process variable values based on a second order response surface mapping representation of the manufacturing process determines the optimal variable values in a single computation for optimizing manufacturing results.

Manufacture of product generally involves a series or sequence of interrelated activities collectively referred to as a manufacturing process. Each activity has one or more process variables which affect the efficiency or yield of the particular activity. In addition, the performance of an activity may, and usually does, affect the performance or requirements of another activity in the overall manufacturing process required to manufacture a product. It will therefore be evident that adjustment of the value or set point of any of the variables in any one activity can have a major impact on the manufacture of the final product. Therefore, it is necessary to calculate by computer and adjust all of the process variable values in order to optimize the manufacturing process. In the prior art, models of a manufacturing process have been developed in which the process variable values are adjusted iteratively by sequential perturbation of process parameters and observation of the effect of the adjustment upon the manufacturing process. In other prior methods, particularly methods associated with two controllers, the independent process variable values are simply adjusted to a predetermined reference value.

In manufacturing processes there are dependent variables or parameters which are the result of performing the process. Each process is associated with a design target value for each dependent variable. In addition, there are independent variables in a manufacturing process which are adjustable. The manufacturing process efficiency performs according to the adjusted values of the independent variables. In the present invention, a method is disclosed for determining the values for the independent variables which are required to optimize overall manufacturing system process performance.

The present invention employs a response surface mapping technique to represent the manufacturing process and to determine the optimal variable values in a single computation for achieving a specified product level target, such as yield. Additionally, in the design and manufacture of a product theoretical values for each of the dependent variables are calculated in order to optimize the manufacturing process. In calculating the values of the independent variables, the present invention seeks a solution most nearly approximating the theoretical values of the dependent variables, i.e., design parameters.

SUMMARY OF THE INVENTION

A principle object of the present invention is, therefore, the provision of a method for selecting manufacturing process variable values which achieve a specified process response.

Another object of the invention is the provision of a method for selecting manufacturing process variable values which yield a specified process response and also approximate design parameters.

A further object of the invention is the provision of a method for selecting manufacturing process variable values based on a second order response surface mapping used to represent the manufacturing process.

A still further object of the invention is the provision of a non-iterative method for selecting process variable values in a single computation based on a second order response surface mapping of the manufacturing process.

Further and still other objects of the present invention will become more apparent when the following specification is read in conjunction with the accompanying drawing.

BRIEF DESCRIPTION OF THE DRAWING

The sole FIGURE is a flow diagram of a preferred embodiment for practicing the present invention.

DETAILED DESCRIPTION

Typically, before a product is to be manufactured, product development and manufacturing engineering organizations design and test both a manufacturing process and a product manufactured according to the process. The manufacturing variable values determined, for instance, in a preproduction product development project are referred to as design parameters. In theory, when all the independent variables, e.g., temperature, energy level, time, etc., are set to achieve the design parameter values, the developed manufacturing process should be optimized for the product being manufactured. However, in practice, the designed manufacturing process variables require fine adjustment in order to optimize the manufacturing process itself. The present invention provides a method of adjusting the independent variable values of a manufacturing process while seeking a solution such that the adjusted value of the dependent variable approximates the design value.

The concept of the invention will best be understood by considering a manufacturing process comprising K independent, controllable variables, i.e., input variables, denoted by vector $\bar{x}$ of length K. The response variable, i.e., output variable, is denoted as dependent variable y having a specified target value of $y_T$. The problem to be solved by use of a computer is the identification of a vector $\bar{x}_r$ which achieves a predetermined manufacturing process output target, i.e., set points vector. If it is not possible to achieve the desired target values, the values will be selected so that the closest values of y to the desired target values $y_T$ result. If multiple solutions to the problem exists, the solution closest to the design parameters $\bar{x}_s$, is the selected solution. In order to demonstrate the present invention, an illustrative example will be described hereinafter. The invention is not limited to the following example which is provided for illustrative purposes only.

A simple planar CMOS capacitor manufacturing process comprises thermal oxidation of doped silicon wafer, followed by an implant step and a drive-in (anneal) step and final metallization. The process variables in the example are to be selected so that a predetermined capacitor threshold voltage is achieved.

The problem to be solved is the determination of various times, temperatures, energy levels, dosages and the like (i.e., values for all the independent variables) which will result in the achievement of the predetermined threshold voltage (or closest to the threshold voltage) while at the same time, the dependent variable values approximate the design parameters of the manufacturing process. Referring now to the figure, a manufacturing process with design or target values is defined in Step 10.

In Step 12, the manufacturing process is expressed as a second order response surface mapping of the process. The mapping is achieved in a known manner by a Design-of-Experiments technique or by simply fitting a second order multi-variant polynomial to manufacturing data obtained from the process.

The surface response is expressed as $$y = b_o + \sum_i b_i x_i + \sum_{ij} B_{ij} x_i x_j$$

where $b_i$ are the linear coefficients and $B_{ij}$ are the quadratric coefficients of the second order surface.

In Step 14, the second order response surface obtained in Step 12 is transformed into its principle axes. The canonical transformation is accomplished by a translation followed by a rotation. The transformation is given by $$x_i = x_{oi} + \sum_j M_{ij} w_j$$

where $|X_O\rangle = -0.5 B^{-1} |b\rangle$ and M is an orthogonal matrix whose columns are the (normalized) eigenvectors of matrix B and $B^{-1}$ is the inverse of matrix B with elements $B_{ij}$. The coordinates $w_i$ are the new (transformed) coordinate axes, and the terms $$w_{si} = \sum_j M_{ij}(x_{sj} - x_{oj})$$

represent design specifications in w-space. The response surface has become $$y = y_o + \sum_j w_i^2 \lambda_i$$

where $\bar{\lambda}$ is a vector of the eigenvalues of matrix B, and $y_O$ is a process response at coordinates $x_i$ where $i = 1 \ldots K$.

In Step 16, a nonlinear transformation to new axes via $\bar{W}^2 \to "\bar{Z}"$ is performed. The second order surface in w-space becomes a first order surface (hyperplane) of dimension k in z-space. The process design specifications are given by $Z_{si} = W_{si}^2$. The response surface is now $y = y_o + \Sigma \lambda_i Z_i$.

In Step 18, the response surface dependent variable y is set to its target value $y_T$. The response surface becomes a hyperplane in K-1 dimension where every point on the hyperplane satisfies the target value requirement. Only positive solutions correspond to the "real world" solutions. The response surface is now $C = y_T - y = \Sigma \lambda_i Z_i$, where C is a scalar.

Next, it is necessary in Step 20 to find the vector $Z_T$ on the hyperplane (in the positive z-space) closest to the process specifications. The result is a desired process values vector in z-space. The vector is $$z_{Ti} = z_{si} + \left(\left(C - \sum_i \lambda_i z_{si}\right)/\Sigma \lambda_i^2\right)\lambda_i.$$

where scalar $$C = y_T - y_o = \sum_i \lambda_i z_i.$$

If $\bar{Z}_T$ contains negative components, the negative components must be set to zero and removed. The formula is recalculated with the corresponding components of $\bar{Z}_s$ and $\bar{\lambda}$ removed. The resulting vector represents direction and distance from a point to a hyperplane.

The z-space coordinates are converted back into the original x-space parameters in Step 22. The converted x-space parameters are the desired result.

The vector components $$x_{Ti} = x_{oi} + \sum_j M_{ij} \sqrt{z_{Ti}}$$

represent process variable values which achieve the target value of the dependent variable or approximates the value of the target value while concurrently being closest to the process design value specifications. The signs of the square root terms are chosen to match the signs belonging to the vector $\bar{W}_s$.

In Step 24, the results of Step 22 are used to adjust the independent process variable values x in the manufacturing process.

The above-described process was tested on a simulation fabrication of a planar CMOS capacitor. The manufacturing (fabrication) process comprised an oxidation step (having the two variables of time and temperature), of an n doped silicon wafer (having a doping concentration variable), followed by an implant step (having dosage and energy variables) followed by an anneal step (having two additional variables of time and temperature) and a metallization step. The response parameter was threshold voltage of the capacitor. Implementation of the above process resulted in the correct determination of all seven listed process variable values in every test case, representing all possible outcomes.

While there has been described and illustrated a method of set point optimization for manufacturing processes with specified target values, variations and modifications will be apparent to those skilled in the art without deviating from the broad scope of the invention which shall be limited solely by the scope of the claims appended hereto.

What is claimed is:

1. A computer method for independent variable value determination for optimizing a manufacturing process with specified dependent variable target values comprising:
   obtaining a second order surface mapping of the manufacturing process;
   transforming said second order surface mapping into its principle axes by canonical transformation;
   performing a non-linear transformation of said transformed second order surface mapping into new axes thereby transforming the second order surface into a first order surface;

setting dependent variables of the process to the target values on said first order surface;

determining the independent variable values on said first order surface which result in dependent variable values which are or approximate the process specified target values;

converting the independent variable values on said first order surface to original coordinate parameters, and adjusting said independent variable values in said manufacturing process according to the converted independent variable values in order to optimize the manufacturing process.

2. A method for independent variable value determination for optimizing a manufacturing process with specified dependent variable target values as set forth in claim 1 wherein said obtaining a second order surface mapping comprises a design-of-experiments techniques.

3. A method for independent variable value determination for optimizing a manufacturing process with specified dependent variable target values as set forth in claim 1, wherein said obtaining a second order surface mapping comprises obtaining manufacturing data corresponding to said manufacturing process and fitting a second order multi-variate polynomial to said obtained manufacturing data.

4. A method for independent variable value determination for optimizing a manufacturing process with specified dependent variable target values as set forth in claim 1 wherein said transforming said second order mapping comprises translation followed by a rotation.

5. In a manufacturing process having adjustable independent process variables and design target values of dependent variables, a method for adjusting independent process variable values for optimizing the manufacturing process comprising the steps of:

defining the manufacturing process with design target values for the dependent variables;

obtaining a second order surface mapping of said defined manufacturing process;

transforming said second order surface mapping into its principle axes by canonical transformation;

performing a non-linear transformation of said transformed second order surface mapping into new axes thereby transforming the second order surface into a first order surface;

setting dependent variables of the process to said target values on said first order surface;

determining said independent variable values on said first order surface which result in dependent variable values which are or approximate said target values;

converting the independent variable values on said first order surface to original coordinate parameters, and adjusting said independent variable values in said manufacturing process according to the converted independent variable values in order to optimize said manufacturing process.

6. In a manufacturing process as set forth in claim 5, said obtaining a second order surface mapping comprising a design-of-experiments technique.

7. In a manufacturing process as set forth in claims 5, said obtaining a second order surface mapping comprising obtaining manufacturing data corresponding to said manufacturing process and fitting a second order multi-variant polynomial to said obtained manufacturing data.

8. In a manufacturing process as set forth in claim 5, said transforming said second order mapping comprising translation followed by a rotation.

* * * * *